United States Patent
Weigert et al.

(10) Patent No.: US 10,161,070 B2
(45) Date of Patent: Dec. 25, 2018

(54) DEVICE AND METHOD FOR THERMAL BONDING OF A TEXTILE WEB

(71) Applicant: TRUETZSCHLER GMBH & CO. KG, Moenchengladbach (DE)

(72) Inventors: Thomas Weigert, Sulzbach (DE); Willi Liebscher, Bruchköbel (DE); Stephan Hajdu, Rödermark (DE)

(73) Assignee: TRUETZSCHLER GMBH & CO. KG, Moenchenglabach (DE)

( * ) Notice: Subject to any disclaimer, the term of this patent is extended or adjusted under 35 U.S.C. 154(b) by 183 days.

(21) Appl. No.: 15/104,964

(22) PCT Filed: Aug. 16, 2014

(86) PCT No.: PCT/EP2014/002254
§ 371 (c)(1),
(2) Date: Jun. 15, 2016

(87) PCT Pub. No.: WO2015/090482
PCT Pub. Date: Jun. 25, 2015

(65) Prior Publication Data
US 2016/0312391 A1    Oct. 27, 2016

(30) Foreign Application Priority Data
Dec. 16, 2013  (DE) .................. 10 2013 114 075

(51) Int. Cl.
*B32B 38/10*   (2006.01)
*D06B 5/08*   (2006.01)
(Continued)

(52) U.S. Cl.
CPC ................ *D06B 5/08* (2013.01); *D04H 1/54* (2013.01); *D06C 7/00* (2013.01); *F26B 13/16* (2013.01);
(Continued)

(58) Field of Classification Search
CPC ........ D04H 3/11; D04H 3/16; B29K 2105/06; D06B 5/08; D06C 29/00; D06C 7/00;
(Continued)

(56) References Cited

U.S. PATENT DOCUMENTS 3,442,740 A    5/1969  David
4,124,942 A *  11/1978 Ohls ..................... D21F 5/182
                                                  34/115
(Continued)

FOREIGN PATENT DOCUMENTS

DE       1604872 A1    2/1971
DE   102007053030 A1   5/2009
(Continued)

OTHER PUBLICATIONS

Translation of DE 10 2007 053030 (original provided by applicant).*
(Continued)

*Primary Examiner* — Mark A Osele
*Assistant Examiner* — Nickolas R Harm
(74) *Attorney, Agent, or Firm* — FisherBroyles, LLP; Robert Kinberg

(57) ABSTRACT

The invention relates to a device and a method for the bonding of a textile web, whereby the textile web is guided over an idler drum into a bonding plant, led around a through-air drum and over a cooling drum and then led out again, whereby heated fresh air flows through the web and the through-air drum and the exhaust air is extracted from the bonding plant. According to the invention, it is intended that cooling air is directed onto the web ahead of the detachment point of the web from the through-air drum onto the web.

8 Claims, 2 Drawing Sheets

(51) Int. Cl.
*D04H 1/54* (2012.01)
*F26B 13/16* (2006.01)
*D06C 7/00* (2006.01)
*F26B 21/00* (2006.01)
*B29K 105/06* (2006.01)
*B32B 43/00* (2006.01)
*D04H 3/11* (2012.01)
*D06C 29/00* (2006.01)
*F26B 13/00* (2006.01)
*F26B 23/00* (2006.01)
*D06C 7/02* (2006.01)
*D04H 3/16* (2006.01)

(52) U.S. Cl.
CPC ........... *B29K 2105/06* (2013.01); *B32B 38/10* (2013.01); *B32B 43/006* (2013.01); *D04H 3/11* (2013.01); *D04H 3/16* (2013.01); *D06C 7/02* (2013.01); *D06C 29/00* (2013.01); *F26B 13/00* (2013.01); *F26B 21/004* (2013.01); *F26B 23/00* (2013.01); *F26B 23/002* (2013.01)

(58) Field of Classification Search
CPC . D06C 7/02; F26B 13/00; F26B 13/16; F26B 21/004; F26B 23/00; F26B 23/002; B32B 38/10
USPC ... 156/62.2, 181, 308.2, 311, 538, 701, 750; 264/125
See application file for complete search history.

(56) References Cited

U.S. PATENT DOCUMENTS

| | | | | |
|---|---|---|---|---|
| 5,575,084 | A * | 11/1996 | Vuorinen | D21F 5/182 34/448 |
| 2006/0213079 | A1 * | 9/2006 | Ribeiro | F26B 13/16 34/595 |
| 2011/0191994 | A1 * | 8/2011 | Takahashi | D04H 1/498 28/167 |
| 2013/0174379 | A1 * | 7/2013 | Ishino | A61F 13/15707 19/98 |

FOREIGN PATENT DOCUMENTS

| | | |
|---|---|---|
| DE | 102009016019 A1 | 10/2010 |
| EP | 0105730 A2 | 4/1984 |
| WO | 2011/127885 A1 | 10/2011 |
| WO | 2012/055732 A1 | 5/2012 |
| WO | 2012/127013 A1 | 9/2012 |

OTHER PUBLICATIONS

English Translation of International Search Report for PCT/EP2014/002254, dated Dec. 1, 2014.
Written Opinion for PCT/EP2014/002254, dated Dec. 1, 2014.
Zack, Thomas A., et al.,Index 84, New Developments in Through-Air Thermal Bonding, 1984, European Disposables and Nonwoven Association, Belgium.†
Nonwovens Industry, p. 40, Mar. 1986.†
Paper Age, p. 47, Apr. 1986.†
Nonwovens World, p. 139, May-Jun. 1986.†
Sales Brochure, Drying, Curing and Bonding for Nonwovens, 1990's, Valmet.†

* cited by examiner
† cited by third party

DEVICE AND METHOD FOR THERMAL BONDING OF A TEXTILE WEB

CROSS-REFERENCE TO RELATED APPLICATIONS

This application is a U.S. National Stage of International Patent Application No: PCT/EP2014/002254 filed Aug. 16, 2014, designating the United States and claiming benefit of German Patent Application No. 10 2013 114 075.0 filed Dec. 16, 2013.

BACKGROUND OF THE INVENTION

The invention relates to a device and a method for the thermal bonding of a textile web, whereby the textile web is guided over an idler drum in a bonding plant, then round a through-air drum and over a cooling drum before being guided out again.

In these thermal bonding plants, nonwovens made from or with thermoplastic fibers are heat set or bonded by means of hot air, saturated steam or hot water in order to reduce stresses in the web and fix the fibers. In this, warmed-up air is fed to a processing space, whereby the fresh air is led through the web into a through-air drum and then extracted via a fan. The fresh air absorbs the moisture from the web and heats this. A negative pressure is created within the bonding plant which, in combination with the air streams, forms different pressure and flow conditions. With the negative pressure, high temperature and loss of moisture, the web tends to adhere to the drum resulting in the operating speed having to be reduced and resulting in damage to the web. The adhering to the drum can be quite strong with certain products, e.g. those containing bicomponent fibers.

A circulating air dryer is described in WO2012/055732A1 with which the air permeability of the screen cover arranged in the housing can be set.

The circulating air dryer of WO2012/127013 manifested an extraction device arranged in the drum with which hot air is sucked from the processing space and through the material web using a large negative pressure.

In DE 102009016019 A1, a circulating air dryer is coupled to a heat exchanger whereby the heat exchanger warms up fresh air and this warmed air is led to the processing space.

DE 102007053030 A1 describes a circulating air dryer in which the web to be dried is led around an air-permeable drum in a housing and redirected by and pulled off a cooling drum. The air from the cooling drum can then get into the drum and mix there with the warm air—which is not efficient.

SUMMARY OF THE INVENTION

The purpose of the current invention is to create a device and a method for thermal bonding of a textile web in the run-out region of the bonding plant in which the web is separated from the through-air drum.

The problem is solved according to claim 1 and claim 9 in that the textile web is guided over an idler drum into the bonding plant, led around a through-air drum, then led out over a cooling drum, whereby heated fresh air flows through the web and the through-air drum and the exhaust air is extracted from the bonding plant.

According to the invention, it is intended that cooling air is directed onto the web ahead of the detachment point of the web from the through-air drum.

The invention assumes that a cooling down shortly before the detachment point produces bonding and a slight shrinkage which causes the web to free itself from the through-air drum.

In this, the cooling air is directed by means of a channel and/or nozzle onto the web. In that way, the region of cooling on the web can be localized, whereby the effectiveness of the bonding plant is not impaired as a large as possible circumferential area of the through-air drum is used for the bonding. The web is cooled by the channel or nozzle over the entire working width.

In a preferred embodiment, the cooling air flows through the web and the through-air drum. This lowers the temperature profile of the web at both sides and is no longer warmed by the through-air drum. The web is therefore cooled over the entire cross-section over the working width, by which the fibers or filaments are bonded and shrink slightly.

By means of an air system, the cooling air of the fresh air and hot air are separated inside the through-air drum to provide improvement. The cooling effect achieved locally on a circumferential area over the working width therefore has no great influence on the energy balance of the bonding plant as the cooling air does not mix with the warmed fresh air and the moisture-saturated hot/exhaust air.

It is advantageous that the air system is formed as an at least partially closed redirection arranged inside the through-air drum and with which the cooling air is again extracted from the bonding plant. The air system therefore limits the cooling effect to a small area of the through-air drum, so that this is only cooled locally.

The formation of the air system as a closed channel has the advantage the cooling air only occurs at two limited areas of the through-air drum, which is advantageous for the temperature level of the through-air drum and the energy balance of the bonding plant is not significantly affected.

The use of the shielding plate to redirect the cooling air has the advantage of the retrofitting capability of the bonding plant, as all necessary add-ons and supplements can take place outside the bonding plant. Should the shielding plate have a dish-shaped convex or concave form, it requires little effort to replace the existing shielding plate with this without having to reconstruct the bonding plant.

Further advantageous embodiments are protected by the sub-claims.

BRIEF DESCRIPTION OF THE DRAWINGS

The invention is explained in more detail by means of the accompanying drawings; in these is shown FIG. 1 A schematic representation of a first embodiment of an invention-related bonding plant.

DETAILED DESCRIPTION OF THE INVENTION

Figure 1:
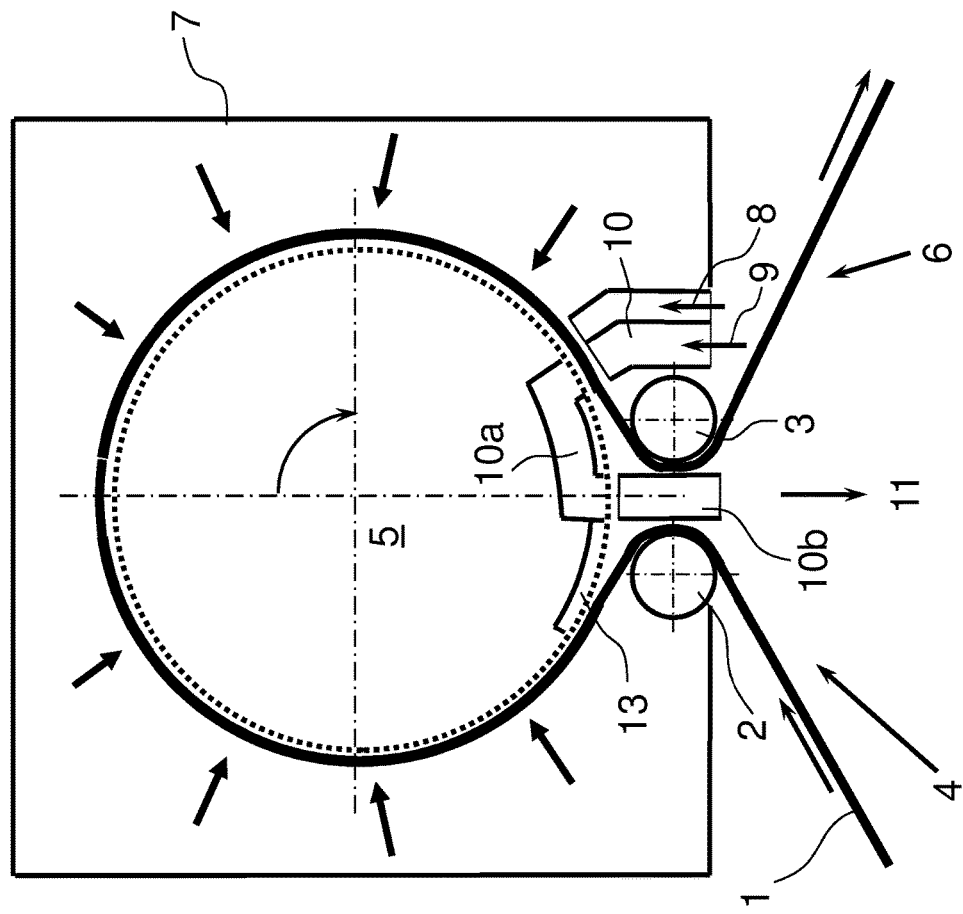

FIG. 1 shows an Omega design bonding plant operated with hot air. The web 1 to be bonded runs in the run-in section 4 over an idler drum 2 that can be embodied as extraction drum into the bonding plant, runs around the air-permeable-designed through-air drum 5 in the clockwise direction and then runs over a cooling drum 3 in the run-out region 6 of the bonding plant. The through-air drum 5, the idler drum 2 and the cooling drum 3 can be arranged in a common housing 7 into which hot fresh air 8 is fed via one or more inlet flow openings. The hot fresh air 8 flows through the web 1, so heating the web; the air is then extracted by a fan, not shown in the figure, located in the end face of the through-air drum 5. In this, the through-air drum 5 is operated at negative pressure so that different flow conditions occur in the bonding plant.

To prevent the web 1 adhering to the through-air drum 5, the invention provides for the web 1 to be cooled shortly before the detachment from the through-air drum 5. For this, a channel 10 in the run-out region 6 is arranged over which cooling air 9 is fed by fans not shown in the figure, onto the web 1. The cooling air 9 flows through the web 1 across the working width and along the axis of the through-air drum and cools this. In this, the cooling air flows through the through-air drum 5 in a locally limited area and redirected via a further channel 10*a* arranged within the through-air drum 5. The cooling air then 9 then flows through the through-air drum 5 for a second time and is extracted again via a channel 10*b* which lies between the idler drum 2 and the cooling drum 3. An inlet for fresh air 8, amongst other things, is arranged in the region of the cooling drum 3. As a separate air system is used for web cooling, and is completely separated from the fresh air and hot air of the bonding plant, the air balance of the bonding plant is not affected. The air system in this embodiment example comprises at least the channel 10*a* that separates the various air streams within the through-air drum 5 from each other and from the run-out region 6 up to the area between the idler drum 2 and the cooling drum 3. The channel 10*a* is formed as a channel closed at the circumference, which also stretches over the working width of the bonding plant parallel to the longitudinal axis of the of the through-air drum and has two openings whereby one opening with channel 10 and the other opening with channel 10*b* interact. A shielding plate 13 closes flush with channel 10*a* and reaches into the run-in region 4 into the area above the idler drum 2. The shielding plate 13 is designed and located parallel to the inner side of the through-air drum and separates the hot air and fresh air within the bonding plant from the ambient air.

An extraction 11 using a fan not shown in the figure, which lies underneath the bonding plant in the region of the idler drum 2 and of the cooling drum 3 can be so arranged that it extracts the cooling air 9 from the channel 10*b*. The channel 10*b* located between the idler drum 2 and the cooling drum 3 can be designed so that it can swivel, which facilitates the introduction of a web 1 when starting up the plant. The bonding plant can also be converted very quickly to working with webs using normal fibers that have no or only a very slight tendency to adhere. An adjustment of the cooling output to the web 1 to be processed can take place by means of a device in which the cross section of the channel 10 is changed and/or the fans transporting the cooling air 9 have a variable power that can be controlled, e.g. using frequency inverters. As an alternative with this embodiment, the cooling air 9 can also be fed via the channel 10*b*, be redirected in the channel 10*a* within the through-air drum 5 and extracted via the channel 10. This flow direction assists the detachment of the web 1 from the through-air drum.

Figure 2:
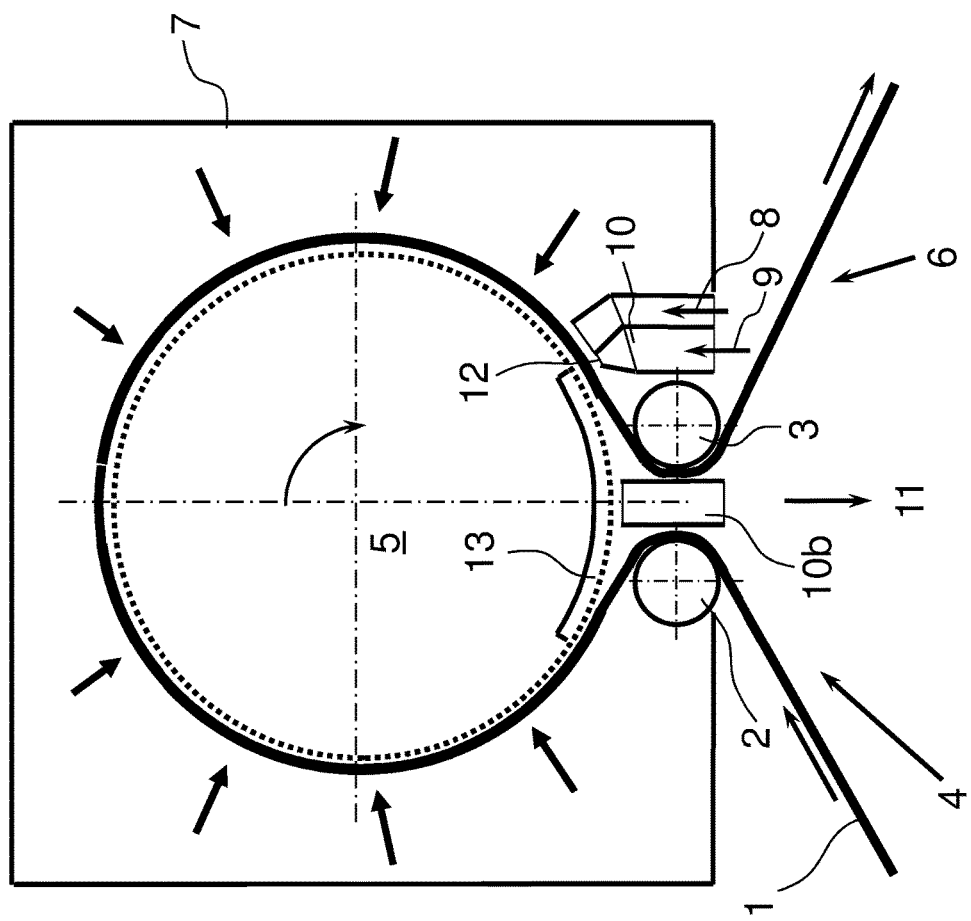
FIG. 2 A schematic representation of a second embodiment of an invention-related bonding plant.

In the second embodiment example according to FIG. 2, in which the bonding essentially has the same structure and the same function, an already known shielding plate 13 is used to extract the cooling air 9 from the bonding plant. The air system in this embodiment example comprises at least the shielding plate 13 that separates the various air streams within the through-air drum from each other and from the run-out region 6 up to the area between the idler drum 2 and the cooling drum 3. The purpose of the shielding plate 13 is to separate the surroundings outside the bonding plant into the run-in and run-out sections 4, 6 in flow terms from the through-air drum 5, as this is at negative pressure and the air flowing in this region between idler drum 2 and cooling drum 3 does not heat up the web 1. The shielding plate 13 can be a convex or concave dished design that is aligned parallel to the inner diameter of the through-air drum. It has the task, on the one hand, of screening off the cooling air 9 from the airflow in the through-air drum 5 but, on the other hand, also to redirect the cooling air 9. In this, the cooling air flows through a nozzle 12 up and through the web 1 into an edge region of the through-air drum 5 and cools the web 1. By means of the nozzle 12, a very narrow strip or area can be cooled whereby the cooling air is directed precisely onto the edge region of the shielding plate 13. Through the shielding plate that can have a dish-shaped convex or concave form, a redirection of the cooling air 9 out of the bonding plant takes place in which this is extracted between the idler drum 2 and the cooling drum 3 via an extraction 11. In a preferred embodiment, a channel 10*b* that can be swiveled can be located between the idler drum 2 and the cooling drum 3. The bonding plant can therefore be converted very quickly to working with material webs using normal fibers that have no, or only a very slight, tendency to adhere. Furthermore, the channel 10*b* that can be swiveled facilitates the introduction of a web 1 when starting up the plant.

In both embodiment examples, the channel 10 or the nozzle 12 is limited to a small local area, but directed parallel to the longitudinal axis of the through-air drum 5 over the entire working width onto the web 1, shortly before the web 1 is guided tangentially onto the cooling drum 3. The detachment point of web 1 from through-air drum 5 is formed from the intersection point of the verticals through the center point of through-flow drum 5 with the tangent between through-air drum 5 and cooling drum 3. As the detachment point of web 1 from the through-air drum depends, amongst other things, on the diameters and the arrangement of the through-air drum 5 and the idler drum 2 or cooling drum 3, the arrangement of the channel 10 or the nozzle 12 can vary. With a through-air drum diameter of, for example 2650 mm, the cooling air 9 can be directed onto the circumference of the through-air drum between 50 mm and 1200 mm in front of the detachment point of the web 1. If the through-air drum 5 is rotating at high speed, the cooling air 9 must be directed at a greater distance from the detachment point on the web 1 as that for a lower speed. The adherence angle of the web 1 has naturally also to be taken into consideration here.

REFERENCE NUMBERS

1 Web
2 Idler drum
3 Cooling drum
4 Run-in region
5 Through-air drum
6 Run-out region
7 Housing
8 Fresh air
9 Cooling air
10 Channel
10*a* Channel
10*b* Channel 11 Extraction
12 Nozzle
13 Shielding plate

The invention claimed is:

1. A device for thermal bonding of a textile web, whereby the textile web is led over an idler drum into a bonding plant, led around a through-air drum and led out again over a cooling drum, whereby heated fresh air flows through the web and the through-air drum and exhaust air is extracted from the bonding plant, wherein cooling air is directed onto the web ahead of a detachment point of the web from the through-air drum, whereby the cooling air is directed onto the web by means of a channel and/or a nozzle and wherein the cooling air flows through the web and the through-air drum.

2. The device according to claim 1, wherein the cooling air is separated from the fresh air and hot air inside the through-air drum by means of an air system.

3. The device according to claim 2, wherein the air system is structured as an at least partially closed redirection arranged inside the through-air drum with which the cooling air is again led off from the bonding plant.

4. The device according to claim 2, wherein the air system comprises at least one channel or one shielding plate.

5. The device according to claim 4, wherein the cooling air is led from the bonding plant via a channel that is arranged in an area between the idler drum and the cooling drum.

6. The device according to claim 5, wherein the channel is arranged so that it can swivel.

7. The device according to claim 4, wherein the shielding plate is formed as a concave or convex dished design.

8. A method for the bonding of a textile web, whereby the textile web is led over an idler drum into a bonding plant, led around a through-air drum and led out again over a cooling drum, whereby heated fresh air flows through the web and the through-air drum and exhaust air is extracted from the bonding plant, wherein the web is cooled by cooling air ahead of a detachment from the through-air drum, and wherein the cooling air that forms a closed redirection within the through-air drum is extracted from the bonding plant by an air system.

* * * * *